US012659984B2

(12) United States Patent
Watts et al.

(10) Patent No.: US 12,659,984 B2
(45) Date of Patent: Jun. 16, 2026

(54) METHODS AND APPARATUS TO SUPPORT LARGE SCALE QoS STATE TRANSITION

(71) Applicant: INTERDIGITAL PATENT HOLDINGS, INC., Wilmington, DE (US)

(72) Inventors: Dylan Watts, Montreal (CA); Patrick Tooher, Montreal (CA); Faris Alfarhan, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 326 days.

(21) Appl. No.: 18/293,123

(22) PCT Filed: Aug. 3, 2022

(86) PCT No.: PCT/US2022/039289
§ 371 (c)(1),
(2) Date: Jan. 29, 2024

(87) PCT Pub. No.: WO2023/014801
PCT Pub. Date: Feb. 9, 2023

(65) Prior Publication Data
US 2024/0357631 A1      Oct. 24, 2024

Related U.S. Application Data

(60) Provisional application No. 63/228,820, filed on Aug. 3, 2021.

(51) Int. Cl.
*H04W 72/543* (2023.01)
*H04W 72/232* (2023.01)
(52) U.S. Cl.
CPC ....... *H04W 72/543* (2023.01); *H04W 72/232* (2023.01)

(58) Field of Classification Search
None
See application file for complete search history.

(56) References Cited

U.S. PATENT DOCUMENTS

2020/0296772 A1* 9/2020 Babaei .............. H04W 74/0833

FOREIGN PATENT DOCUMENTS

EP        3 478 019        5/2019
WO     2020/032659      2/2020
(Continued)

OTHER PUBLICATIONS

Pokhrel et al.., "Towards Enabling Critical mMTC: A review of URLLC within mMTC," IEEE Access, 2020.
(Continued)

*Primary Examiner* — Hong S Cho
(74) *Attorney, Agent, or Firm* — Volpe Koenig

(57) ABSTRACT

A method and WTRU for resource re-allocation is disclosed. A WTRU may be configured to receive a radio network temporary identifier (RNTI) and receive fallback configuration information. The WTRU may be configured to receive an indication. The indication may indicate that a particular resource or set of resources are no longer available. The indication may comprise applicability criteria and applicability resource information. The WTRU may be configured to apply the fallback configuration in resources based on the applicability resource information on a condition that a characteristic of the WTRU matches at least one applicability criteria. The WTRU may be configured to transmit uplink data based on the fallback configuration. The fallback configuration may comprise at least one of: a measurement configuration, a configured grant configuration, a random access channel (RACH) configuration, or a physical downlink control channel (PDCCH) monitoring periodicity configuration.

20 Claims, 10 Drawing Sheets

(56) References Cited

FOREIGN PATENT DOCUMENTS

| WO | 2020/068251 | 4/2020 |
| WO | 2020/198356 | 10/2020 |
| WO | 2021/127021 | 6/2021 |

OTHER PUBLICATIONS

Third Generation Partnership Project, "Technical Specification Group Radio Access Network; NR; NR and NG-RAN Overall Description; Stage 2 (Release 16)," 3GPP TS 38.300 V16.6.0 (Jun. 2021).

Third Generation Partnership Project, "Technical Specification Group Radio Access Network; NR; NR and NG-RAN Overall Description; Stage 2 (Release 16)," 3GPP TS 38.300 V16.9.0 (Jun. 2022).

Third Generation Partnership Project, "Technical Specification Group Radio Access Network; NR; NR and NG-RAN Overall Description; Stage 2 (Release 17)," 3GPP TS 38.300 V17.1.0 (Jun. 2022).

Third Generation Partnership Project, "Technical Specification Group Radio Access Network; NR; Medium Access Control (MAC) protocol specification (Release 16)," 3GPP TS 38.321 V16.5.0 (Jun. 2021).

Third Generation Partnership Project, "Technical Specification Group Radio Access Network; NR; Medium Access Control (MAC) protocol specification (Release 16)," 3GPP TS 38.321 V16.9.0 (Jun. 2022).

Third Generation Partnership Project, "Technical Specification Group Radio Access Network; NR; Medium Access Control (MAC) protocol specification (Release 17)," 3GPP TS 38.321 V17.1.0 (Jun. 2022).

Third Generation Partnership Project, "Technical Specification Group Radio Access Network; NR; Radio Resource Control (RRC) protocol specification (Release 16)," 3GPP TS 38.331 V16.5.0 (Jun. 2021).

Third Generation Partnership Project, "Technical Specification Group Radio Access Network; NR; Radio Resource Control (RRC) protocol specification (Release 17)," 3GPP TS 38.331 V17.1.0 (Jun. 2022).

Third Generation Partnership Project, "Technical Specification Group Radio Access Network; NR; Radio Resource Control (RRC) protocol specification (Release 16)," 3GPP TS 38.331 V16.9.0 (Jun. 2022).

* cited by examiner

Figure 1D:
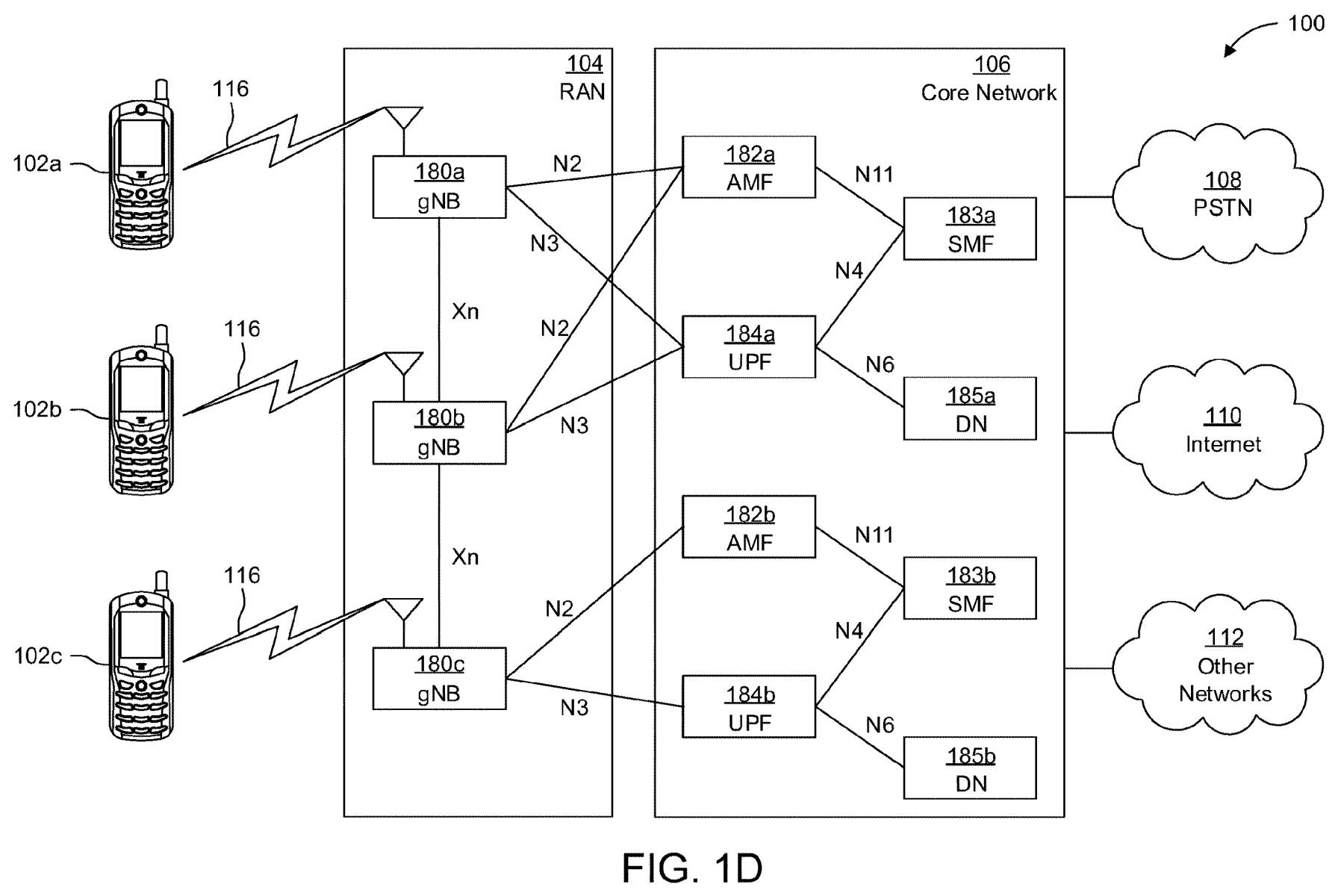

106 Core Network

183a SMF

185a DN

183b SMF

185b DN

N11

N4

N6

N11

N4

N6

182a AMF

184a UPF

182b AMF

184b UPF

104 RAN

N2

N3

N2

N3

N2

N3

180a gNB

Xn 180b gNB

Xn 180c gNB

116

116

116

102a

102b

102c

108 PSTN

110 Internet

112 Other Networks

WTRU Receives QoS State Configuration Information          ⟋ 210

WTRU Receives Trigger Indication to Transition between QoS States          ⟋ 220

WTRU Transitions between QoS States          ⟋ 230

WTRU Applies Configuration Associated with New QoS Sate          ⟋ 240

300

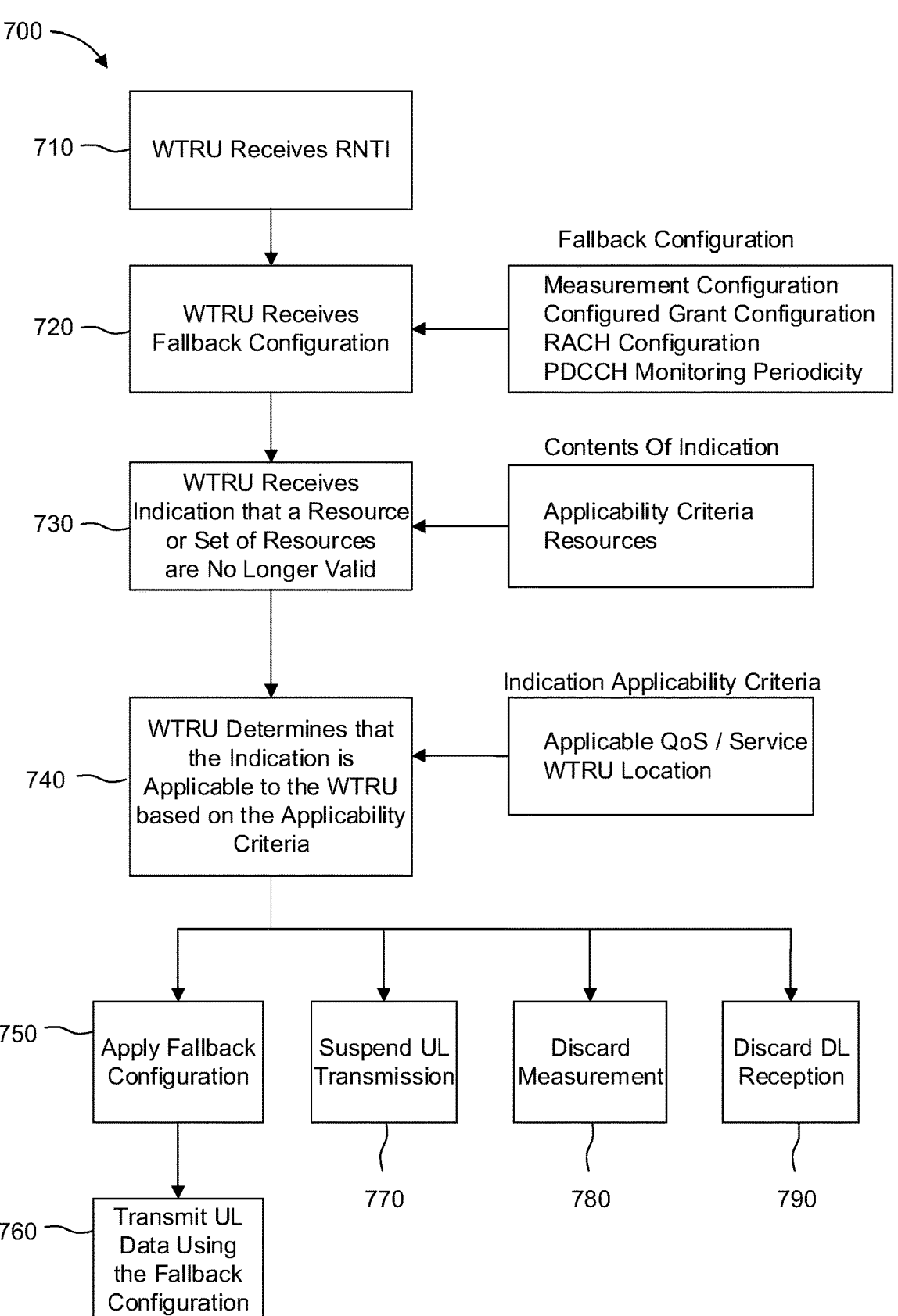

700

710 — WTRU Receives RNTI

Fallback Configuration

720 — WTRU Receives Fallback Configuration

Measurement Configuration
Configured Grant Configuration
RACH Configuration
PDCCH Monitoring Periodicity Contents Of Indication 730 — WTRU Receives Indication that a Resource or Set of Resources are No Longer Valid Applicability Criteria
Resources Indication Applicability Criteria 740 — WTRU Determines that the Indication is Applicable to the WTRU based on the Applicability Criteria Applicable QoS / Service
WTRU Location 750 — Apply Fallback Configuration Suspend UL Transmission Discard Measurement Discard DL Reception 760 — Transmit UL Data Using the Fallback Configuration

METHODS AND APPARATUS TO SUPPORT LARGE SCALE QoS STATE TRANSITION

CROSS-REFERENCE TO RELATED APPLICATIONS

This application is the U.S. National Stage, under 35 U.S.C. § 371, of International Application No. PCT/US2022/039289 filed Aug. 3, 2022, which claims the benefit of U.S. Provisional Application No. 63/228,820, filed Aug. 3, 2021 the contents of which are incorporated herein by reference.

BACKGROUND

Massive machine-type communications (mMTC) is primarily focused on support for mass connectivity and low-power devices (e.g. sensors in smart grids or industrial applications). 5G New Radio (NR) supports uplink (UL) and downlink (DL) services of different quality of service (QoS) requirements within a single transmission, including traffic of varying latency and reliability requirements. NR supports time-sensitive communications and networking, including deterministic and non-deterministic time-sensitive networking (TSN) traffic patterns and flows, which may be prevalent in, for example, factory automation settings, using licensed or unlicensed spectrum.

SUMMARY

A method and wireless transmit/receive unit (WTRU) for resource re-allocation is disclosed. A WTRU may be configured to receive a radio network temporary identifier (RNTI). The WTRU may be configured to receive fallback configuration information. The WTRU may be configured to receive an indication. The indication may indicate that a particular resource or set of resources are no longer available. The indication may comprise applicability criteria and applicability resource information. The WTRU may be configured to apply the fallback configuration in resources based on the applicability resource information on a condition that a characteristic of the WTRU matches at least one applicability criteria. The WTRU may be configured to transmit uplink data based on the fallback configuration. The fallback configuration may comprise at least one of: a measurement configuration, a configured grant configuration, a random access channel (RACH) configuration, or a physical downlink control channel (PDCCH) monitoring periodicity configuration. The RNTI may be a clear channel RNTI (CC-RNTI). The indication may be a clear channel indication. The applicability criteria may comprise at least one of: an applicable quality of service (QoS), a WTRU type, a WTRU location, a QoS state transition group, a packet characteristic for an upcoming transmission or reception during the resources indicated by the applicability resource information; whether information to be transmitted or received during the resources indicated by the applicability resource information is necessary for the WTRU to maintain a connection to the network; whether the WTRU will receive or transmit information related to life safety; a unified access control (UAC) class of a WTRU connection; a device type, a WTRU speed, a WTRU power class, or a mobility state estimation status. The applicability resource information may comprise at least one of: semi-static resources, a time duration, and a frequency duration. The WTRU may be configured to suspend an uplink transmission on a condition that a characteristic of the WTRU matches at least one applicability criteria and the WTRU has an uplink grant for which resources of the uplink grant overlap with resources of the applicability resource information. The WTRU may be configured to discard measurements on a condition that a characteristic of the WTRU matches at least one applicability criteria and the WTRU has measurement resources that overlap with resources of the applicability resource information. The WTRU may be configured to discard a downlink reception on a on a condition that a characteristic of the WTRU matches at least one applicability criteria and the WTRU has downlink reception resources that overlap with resources of the applicability resource information. The WTRU may be configured to perform an action on a condition that the WTRU matches at least one applicability criteria. The action may comprise at least one of: entering a discontinuous reception (DRX) state; performing a mobility action; performing a bandwidth part (BWP) switch; or modifying a radio resource control (RRC) state.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment; and FIG. 1D is a system diagram illustrating a further example RAN and a further example CN that may be used within the communications system illustrated in FIG. 1A according to an embodiment;

FIG. 7 is an example method for re-purposing scheduled resources.

DETAILED DESCRIPTION

Figure 1A:
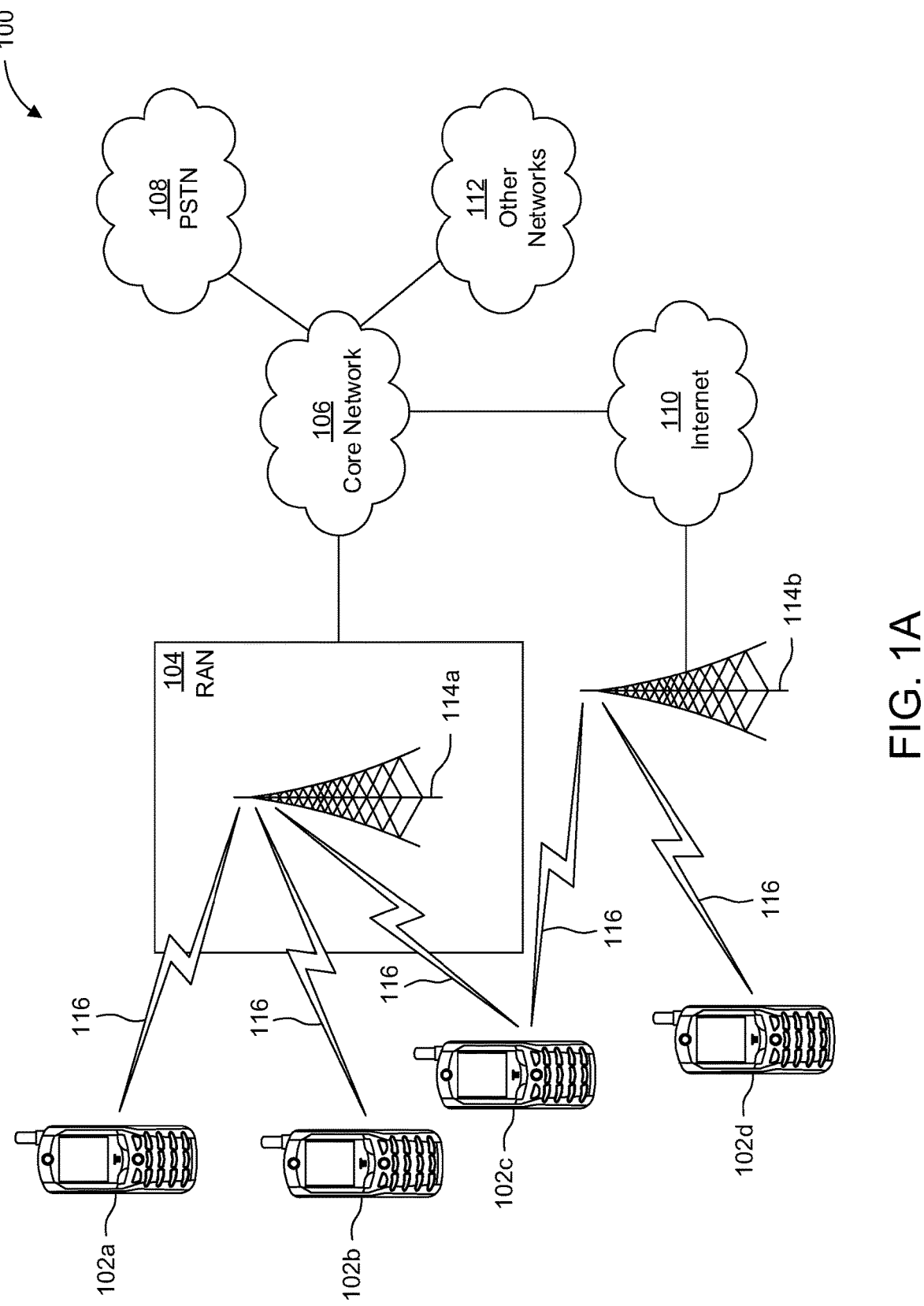
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station

114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN).

In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
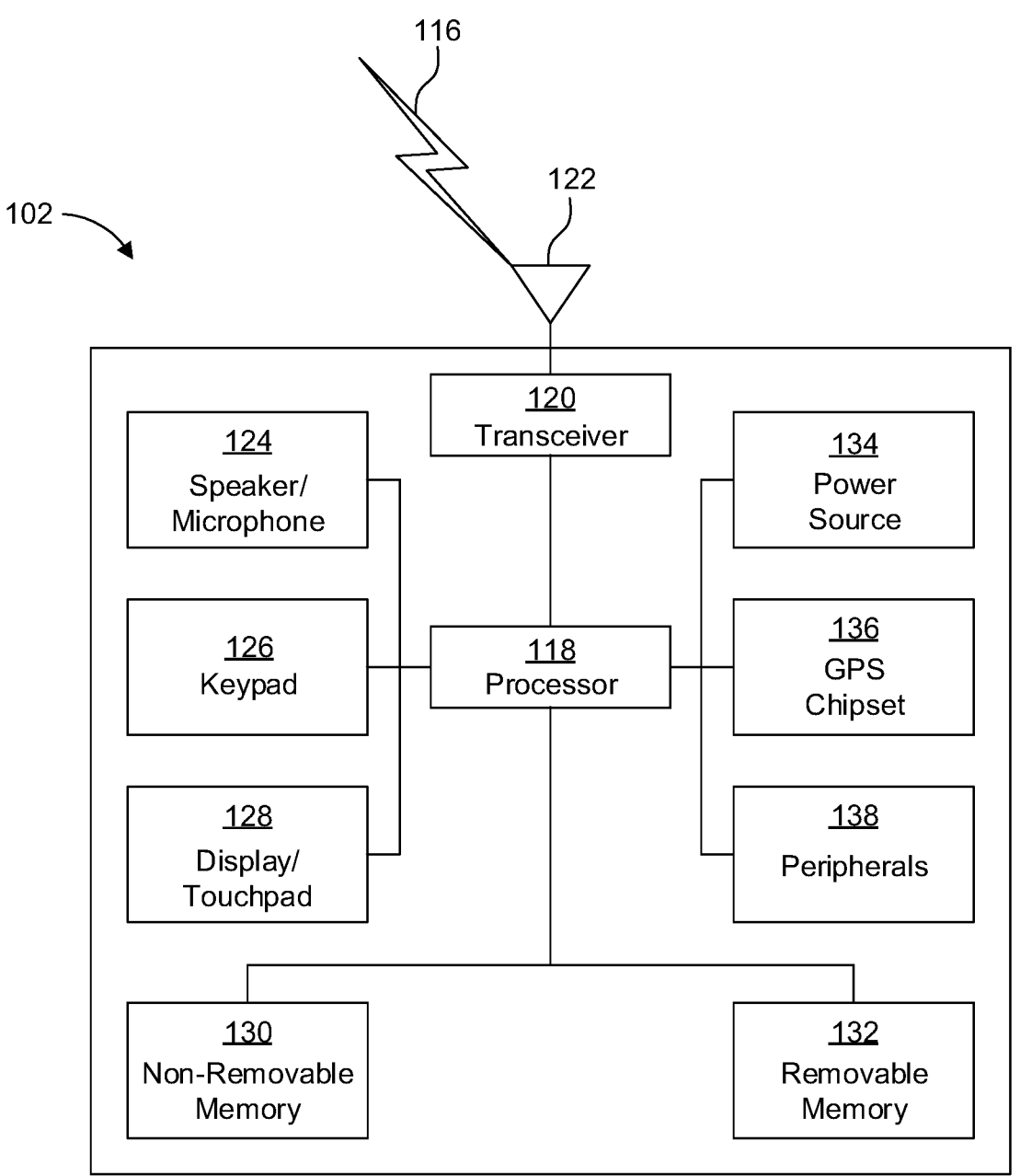
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
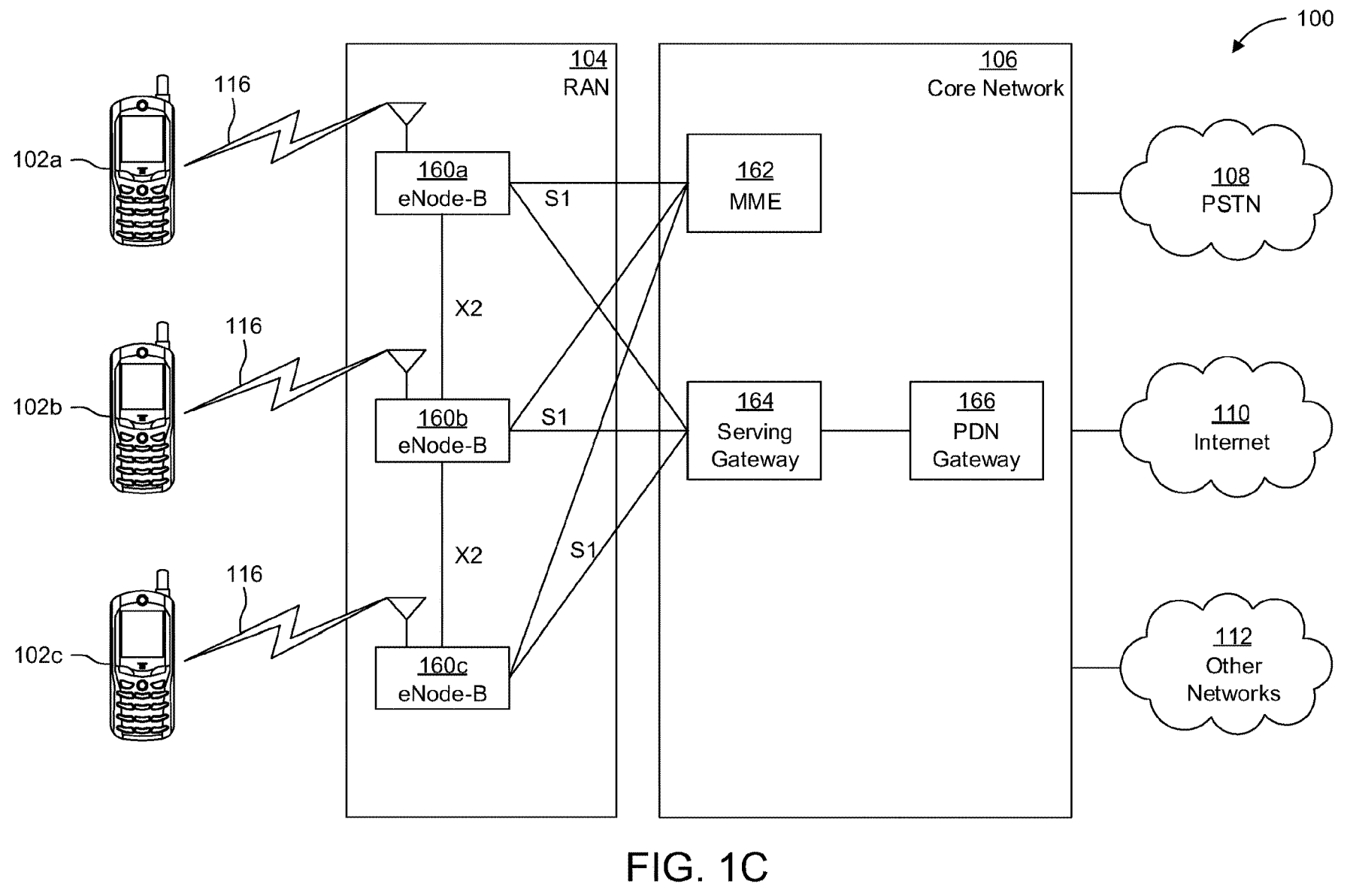

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communications (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following terminology is used and may be assumed through this disclosure. A Physical Random Access Channel (PRACH) resource may be a PRACH resource (e.g., in frequency), a PRACH occasion (RO) (e.g., in time), a preamble format (e.g., in terms of total preamble duration, sequence length, guard time duration and/or in terms of length of cyclic prefix) and/or a certain preamble sequence used for the transmission of a preamble in a random access procedure. MsgA may be a preamble and payload transmissions on PRACH and physical uplink shared channel (PUSCH) resources respectively in a 2-step random access (RA) procedure. MsgB may be a downlink response to MsgA, which may be a success random access response (RAR), fallback RAR, or a backoff indication. Random Access Channel (RACH) Occasion (RO) may be a RACH occasion. Feature and use case may be used interchangeably herein. A use case may correspond to an indication or one or more WTRU features or capabilities.

A property of scheduling information (e.g., an uplink grant or a downlink assignment) may comprise of at least one of the following: a frequency allocation; an aspect of time allocation such as a duration; a priority; a modulation and coding scheme; a transport block size; a number of spatial layers; a number of transport blocks to be carried; a transmission configuration indicator (TCI) state or service request indicator (SRI); a number of repetitions; whether the grant is a configured grant type 1, type 2, or a dynamic grant.

An indication by a downlink control information (DCI) may comprise of at least one of the following: an explicit indication by a DCI field or by radio network temporary identifier (RNTI) used to mask a cyclic redundancy check (CRC) of a physical downlink control channel (PDCCH); an implicit indication by a property such as DCI format, DCI size, control resource set (CORESET) or search space, aggregation level, identity of first control channel resource (e.g., index of first CCE) for a DCI, where the mapping between the property and the value may be signaled by radio resource control (RRC) or medium access control (MAC).

The following key performance indicators (KPIs) may be defined for mMTC: massive connection density of $10^{\wedge 6}$ devices per square kilometer in an urban environment; maximum coupling loss (MCL) up to 164 dB for wide coverage; and device battery lifetime over ten years, with a stored energy capacity of 5 Wh.

Building upon the introduction of NB-IoT in LTE Rel-13 and enhanced versions throughout subsequent releases, mMTC in 5G NR provides multiple important improvements. Examples of the improvements include greater support for Vertical IoT domains including NR IIoT, service-based architecture enhancements, enhanced network and RAN slicing, enhanced automation and orchestration, and architecture support for time-based networking.

3GPP has developed several study and work items in Release 16 to further address aspects related to mMTC KPIs, such as ePowerSaving and Reduced Capability features. Examples of new capabilities may include measurement relaxation based on whether a WTRU is in a low mobility state, fixed state, or in cell center, introduction of eDRX to RRC inactive state WTRUs, and paging enhancements to reduce false paging.

If a WTRU may be configured with enhanced intra-WTRU overlapping resources prioritization, in case a configured uplink grant transmission overlaps in time with dynamically allocated uplink transmission or with another configured uplink grant transmission in a same serving cell, the WTRU may prioritize a transmission based on a comparison between a highest priority of the logical channels that have data to be transmitted and which are multiplexed or may be multiplexed in a MAC PDU associated with the overlapping resources. Similarly, in a case of a configured uplink grant transmission or a dynamically allocated uplink transmission overlaps in time with a scheduling request transmission, the WTRU may prioritize the transmission based on a comparison between the priority of the logical channel which triggered the scheduling request and the highest priority of the logical channels that have data to be transmitted and which are multiplexed or may be multiplexed in a MAC PDU associated with the overlapping resource. In a case that the MAC PDU associated with a deprioritized transmission has already been generated, the WTRU may keep it stored to allow a gNB to schedule a retransmission. The WTRU may also be configured by the gNB to transmit the stored MAC PDU as a new transmission using a subsequent resource of the same configured uplink grant configuration when an explicit retransmission grant is not provided by the gNB.

In a time sensitive network (TSN), an achievable time synchronization accuracy may be dependent on a maximum gNB-to-WTRU distance in case the WTRU would not compensate for the radio propagation delay between the gNB and the WTRU. The maximum timing synchronization error may be dependent on an inter-site/inter-WTRU distance, a subcarrier spacing, and whether the WTRU propagation delay compensation is applied. To meet clock synchronization requirements, accurate reference timing delivery by a gNB to WTRUs may be carried out using broadcast and/or unicast RRC signaling.

NG-RAN supports overload and access control functionality such as RACH back off, RRC Connection Reject, RRC Connection Release and WTRU based access barring mechanisms. A unified access control framework may apply to all WTRU states (RRC_IDLE, RRC_INACTIVE and RRC_CONNECTED) for NR. NG-RAN broadcasts barring control information associated with Access Categories and Access Identities, in case of network sharing, the barring control information may be set individually for each PLMN. The WTRU may determine whether an access attempt is authorized based on the barring information broadcast for the selected PLMN, and the selected Access Category and Access Identity (ies) for the access attempt. For NAS triggered requests, the NAS may determine the Access Category and Access Identity or Identities. For AS triggered requests, RRC may determine the Access Category while NAS may determine the Access Identity or Identities.

A gNB may handle access attempts with establishment causes "emergency", "mps-PriorityAccess" and "mcs-PriorityAccess" (i.e. emergency calls, MPS, MCS subscribers) with high priority and may respond with RRC Reject to these access attempts in extreme network load conditions that may threaten the gNB stability.

A gNB may cancel a PUSCH transmission, or a repetition of a PUSCH transmission, or an SRS transmission of a WTRU for another WTRU with a latency-critical transmission. The gNB may configure WTRUs to monitor cancelled transmission indications using a cancellation indication (CI)-RNTI on a PDCCH. If a WTRU receives the cancelled transmission indication, the WTRU may cancel the PUSCH transmission from the earliest symbol overlapped with the resource or the SRS transmission overlapped with the resource indicated by cancellation.

5G NR services are broadly categorized into three classes: mMTC for mass connectivity/low-powered devices, URLLC for critical/industrial applications, and eMBB for bulk data transmission. Initial releases of 5G NR defined features to fulfill needs of each class individually. Next generation applications will require a combination of features such as extended reality (XR) (combination of URLLC/eMBB), or critical mMTC (mMTC and URLLC) where devices may act as IoT most of the time but once triggered require a large scale URLLC service. Examples of these devices may be: sensors in a factory setting, V2X or smart grid road monitoring devices, or devices meant for emergency use such as smoke alarms or health care equipment.

mMTC and URLLC devices represent nearly opposite requirements in terms of channel resources. A critical mMTC device may require an immediate QoS transition, with possibly many mMTC devices triggered by the same event simultaneously. This may lead to a huge impact to signaling overhead and resource requirements, impacting other (possibly high-priority) WTRUs attempting to access the network.

Enhancements are necessary to facilitate a low-overhead QoS state transition (e.g. from IoT to URLLC) for many devices simultaneously, while ensuring service requirements are satisfied for critical devices and other high-priority WTRUs.

In an embodiment, a WTRU may receive and may store multiple state-based configurations with an associated triggering condition. Upon a triggering event or an explicit indication, the WTRU may apply an associated default set of state-based parameters. The WTRU may receive multiple configurations, triggering conditions, or list of follow-up actions associated with a particular QoS state. Possible configurations may be a RACH priority indication, reserved preambles, measurement configurations, PDCCH monitoring periodicities, unified access control (UAC) value, power ramping value, or BWP. Possible triggering conditions may be an event detection (i.e. industrial motion sensor, accident detection in V2X, indication from network) or an explicit indication from a network or higher layers. The WTRU may apply the configuration and may perform follow-up actions mapped to or associated with the satisfied triggering condition. For example, the WTRU may alter measurements or a PDCCH monitoring periodicity, perform random access, terminate a connection, enter DRX, or report to a network. The WTRU may revert to a default QoS state or configuration upon satisfaction of one or more conditions such as: expiration of a time associated with a configuration, explicit indication from a network (e.g. RRC reject), or configuration subject to periodicity.

In an embodiment, a WTRU may be assigned to a group with similar QoS state transition characteristics (e.g. periodicity or monitoring the same event) and may perform a QoS state transition in a coordinated manner. The WTRU may be assigned to a group where a QoS state transition may be performed in a joint manner. Possible methods of assignment to a group may be: group RNTI, preamble, network slice, device type, UAC access class, BWP, dedicated resources (e.g. time/frequency). The WTRU may be grouped based on for example, device type, UAC, or geographic position. The WTRU may coordinate with other WTRUs within a group prior to QoS state transition (e.g. via sidelink) upon satisfaction of a QoS state triggering condition. The WTRU may report to a node (e.g. a master node) and upon reception of multiple trigger indications the master node may report to a network or indicate to other WTRUs to perform a QoS transition. The WTRU may modify a behavior based on a number of WTRUs reporting an event within a group. For example, the WTRU may select between QoS configurations or alter an amount of requested resources.

In an embodiment, a WTRU may have scheduled resources re-purposed to provide access to higher priority critical mMTC devices. A WTRU may monitor for an indication that indicates resources are no longer available, permitted, or valid. The indication may be referred to as a channel clear or clear channel indication. The indication may be transmitted in a broadcast or a unicast manner. The indication may be indicated via a RNTI (e.g. clear channel RNTI). The indication may indicate a duration (e.g. time resources), a frequency range (e.g. frequency resources), a periodicity, a WTRU class (e.g. device type applicable), or may act as a trigger to a preconfigured behavior. The indication may apply to a specific type of transmission (e.g. PUSCH, all UP data, CP data, measurement resources, or priority level). The WTRU may perform one or more actions upon detection of the indication. The WTRU may cancel an UL transmission (e.g. discard or buffer a transport block) or a DL reception. The WTRU may enter a discontinuous reception (DRX) cycle. The WTRU may enter an IDLE/INACTIVE state. The WTRU may alter measurement resources or configuration. The WTRU may revert to a set of default parameters. The WTRU may attempt to access a channel which has been cleared, if explicitly configured with an ability, under emergency UAC access class, URLLC requirements are about to be violated. The WTRU may attempt a RACH procedure with a dedicated RNTI for use during a cleared channel duration.

To minimize overhead in transitioning a WTRU to a different set of QoS requirements, the WTRU may have multiple QoS states set up which may allow the WTRU to quickly change between different QoS levels.

A WTRU may be configured with one or more QoS states or operating modes. A first QoS state may enable regular or fallback operation. A second QoS state may enable emergency or enhanced operation. For some WTRUs, fallback operation may enable greater latency and/or reduced reliability performance and emergency operation may enable lower latency and increased reliability performance. For other WTRUs, the fallback operation may enable lower latency and/or increased reliability performance and emergency operation may enable greater latency and/or reduced reliability performance.

Figure 2:
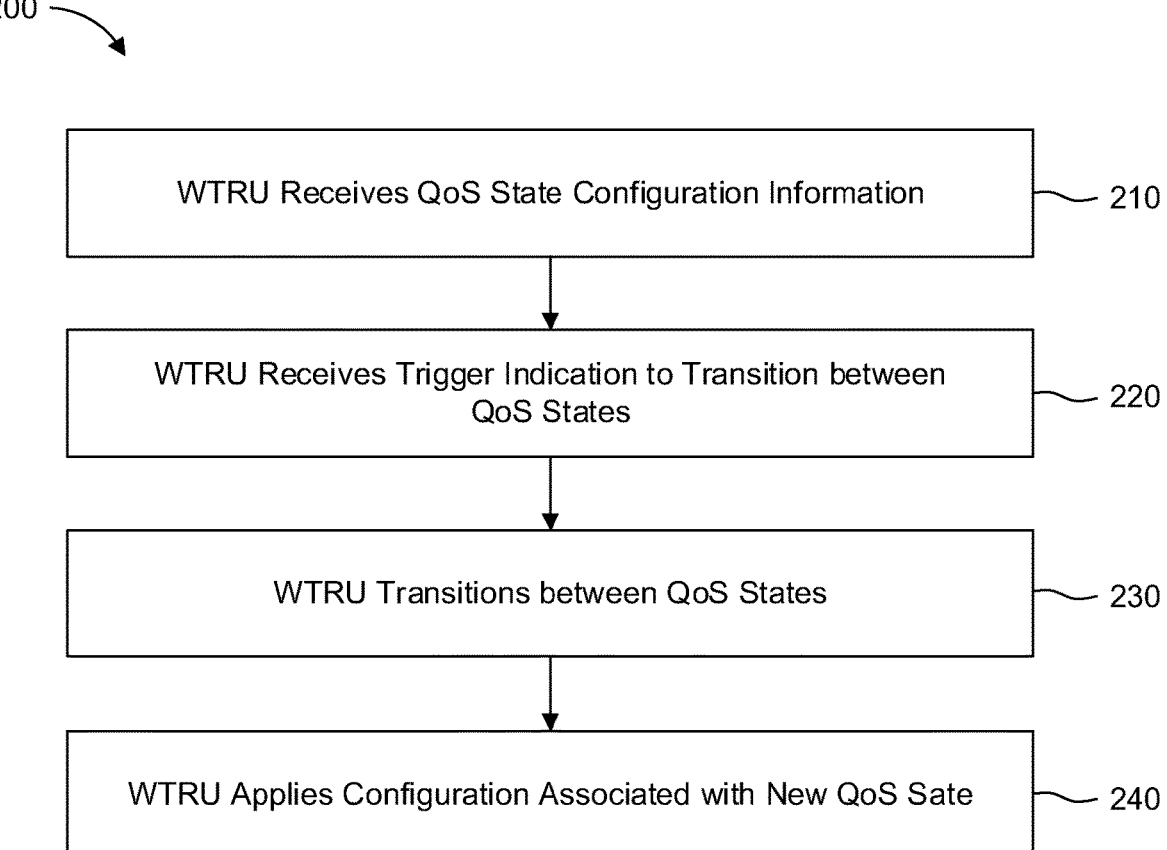
FIG. 2 is an example method of WTRU transitioning between QoS states.

FIG. 2 shows an example method of a WTRU transitioning between QoS states (200). A WTRU may receive configuration information (210). The configuration may comprise QoS state configuration information. The configuration information may comprise information regarding a plurality of QoS state configurations. The configuration information may comprise one or more triggering conditions associated with a QoS state configuration. The configuration information may comprise one or more follow-up actions to perform that are associated with a QoS state configuration. The configuration information may be a RACH priority indication, reserved preambles, measurement configurations, PDCCH monitoring periodicities, unified access control (UAC) value, power ramping value, BWP, or other configurations described herein.

A QoS state may be associated with a set of configurations or parameters. The set of configurations or parameters may include one or more of the following: monitoring of a QoS switch indicator (e.g. each QoS state may be associated with different monitoring patterns to detect a switch indication and the monitoring may be for a transmission from a gNB or from another WTRU); QoS state transition indicating transmission configurations (e.g. each QoS state may be associated with different configurations (e.g. resources) to transmit a QoS state transition indication to a gNB or to other WTRUs); a QoS state timer (e.g. a QoS state may be associated with a QoS state timer, and upon expiration the WTRU may switch to a different QoS state); a QoS state counter (e.g. a WTRU may count a number of events occurring while in a QoS state, and upon the counter reaching a configurable value, the WTRU may switch QoS states); a Random Access configuration (e.g. each QoS state may be associated with a set of RACH slots, ROs, PRACH resources, RA type (2-step or 4-step), RA priority, or power ramping rules); configured resources (e.g. each QoS state may be associated with different configured grant (CG) or PUCCH resources); radio link failure (RLF) configuration; beam failure detection (BFD) configuration; DRX configuration (e.g. each QoS state may be associated with a different DRX cycle or, ONduration periods); reference signals (e.g. each QoS state may be associated with different periodic, semi-persistent or aperiodic RS resources); measurement configuration; paging (e.g. each QoS state may be associated with different paging configurations (e.g. Paging Occasions, Paging frames); Listen Before Talk (LBT) configuration (e.g. each QoS state may be associated with a set of LBT parameters (e.g., LBT Type, contention window size (CWS), channel access priority class (CAPC), directional LBT configuration, receiver-assisted LBT configuration, backoff)); bandwidth part (BWP) or subcarrier spacing (SCS) (e.g. a WTRU may determine the active UL or DL BWP as a function of the active QoS state); carrier (e.g. each QoS state may be associated with a different PCell or set of SCells); PDCCH monitoring configuration; logical channel prioritization (LCP); TCI state or QCL index or beam; power control parameters; non-orthogonal multiple access (NOMA)?parameter (e.g. each QoS state may be associated with a different set of NOMA parameters (e.g., sequences)); sidelink parameters; neighbor cell measurement occasions and parameters; handover (HO) configuration (e.g. each QoS state may be associated with different configured HO parameters); bearer configuration (e.g. each QoS state may be associated with a different set of bearers).

The WTRU may be configured with a set of radio bearers applicable to each QoS state. Upon switching from a first QoS state to a second QoS state, the WTRU may deactivate bearers associated with the first QoS state and activate bearers associated with the second QoS state.

The WTRU may maintain a QoS state per bearer. For example, a first bearer may operate in a first QoS state and a second bearer may operate in a second QoS state. The WTRU may determine to switch the QoS state on a per bearer basis.

The WTRU may receive an indication (i.e. trigger) to transition from a first QoS state to a second QoS state (220). Upon reception of the trigger indication, the WTRU may assume that all current configurations have been deactivated. For example, a trigger indication to transition from a first QoS state to a second QoS state may also be interpreted by a WTRU as a deactivation of all CG resources associated with the first QoS state. The WTRU may be configured with one or more triggers to initiate transition from a first QoS state to a second QoS state. A triggering condition may be an event detection (e.g. an industrial motion sensor, an accident detection in V2X, an indication from network). The triggering condition may be an explicit indication from the network (e.g. gNB) or higher-layers.

The WTRU may determine (e.g. autonomously) to transition from a first QoS state to a second QoS state. The WTRU may determine to transition based on at least one of: an indication from an associated or connected node (e.g., sensor); a measurement. (e.g. a WTRU may transition if a measurement (e.g. interference or channel) on a resource is above or below a threshold value); UL LBT failure; beam failure detection; RLF; survival time expiration; or determination of a negative acknowledgment (NACK) for one or more DL transmissions.

The WTRU may receive an indication from a network entity (e.g. a gNB) to transition from one QoS state to another QoS state. The indication may be received by at least one of: a DCI (e.g. a WTRU may receive a scheduling or non-scheduling DCI indicating a transition from a first QoS state to a second QoS state); MAC CE; reception of a signal (e.g., reference signal (RS), primary synchronization signal (PSS), secondary synchronization signal (SSS), phase tracking reference signal (PT-RS)); upon detecting an SSB with a specific index, the WTRU may transition from a first QoS state to a second QoS state; and HARQ feedback (e.g. a WTRU may transition from a first QoS state to a second QoS state upon reception of a NACK for one or more specific HARQ processes).

A WTRU may receive an indication from another WTRU to transition from one QoS state to another QoS state. The indication may be a reception of a sidelink signal (e.g. RS). The indication may be a reception by a first WTRU of a second WTRU transmission indicating that the second WTRU is transitioning from a first QoS state to a second QoS state. This transmission may indicate a cause for the second WTRU to transition. The indication may be a reception of a transmission from a primary WTRU in a group of WTRUs. For example, WTRUs may be grouped together and in each group there may be one or more primary WTRUs. A non-primary WTRU may attempt to receive a transmission from a primary WTRU of the same group, indicating a QoS state transition. In another example, a non-primary WTRU may attempt to receive a transmission from any primary WTRU (e.g., from any group including its own group) and if the non-primary WTRU receives a transmission from a primary WTRU, the non-primary WTRU may determine what state to transition to or whether to transition, depending on the group of the non-primary WTRU and the group of the primary WTRU making the transmission.

The WTRU may transition between QoS states (i.e. transition from a first or current QoS state to a second or new QoS state) (230). The WTRU may activate or apply an appropriate configuration (240). The appropriate configuration applied may be associated to the trigger indication and QoS state configuration information. The WTRU may transmit a QoS state transition indication to a gNB or another WTRU before the QoS state transition as a QoS state transition notification. The WTRU may transmit a QoS state transition indication to a gNB or another WTRU before the QoS state transition as a QoS state transition request and my transition between QoS states after receiving an acknowledgment from the gNB or the another WTRU in response to the transmitted QoS state transition indication. The WTRU may transmit a QoS state transition indication to a gNB or another WTRU after the QoS state transition as a QoS state transition confirmation.

The WTRU may transmit the QoS state transition indication as a QoS state transition notification, a QoS state transition request, or a QoS state transition confirmation to a gNB or to other another WTRU by at least one of: a random access (RA) procedure (e.g. a WTRU may transmit a PRACH preamble with specific parameters that indicate a QoS state transition request or indication or confirmation. The RA procedure may be done on RA resources of the original QoS state or that of the new QoS state); MAC CE; higher layer signaling (e.g. RRC); configured grant (CG) transmission (e.g. the CG transmission may be done using the CG resources of the original QoS state or that of the new QoS state); a PUCCH transmission (e.g. the PUCCH transmission may be done using the PUCCH resources of the original QoS state or that of the new QoS state); RS transmission (e.g. the RS transmission may be done using the RS resources of the original QoS state or that of the new QoS state).

For a case where the WTRU is a primary WTRU of a group, if it is triggered to transition between QoS states, it may transmit an indication to all the WTRUs in the group. This transmission may be done on a group-common channel.

After detecting, determining, or performing a QoS type/state transition, the WTRU may trigger a new system access request. For example, the WTRU may initiate a new RACH procedure or SR, or indicate the QoS state transition to the network (e.g. by multiplexing the indication part of a PUSCH transmission in a MAC CE, an SDAP header, or a QoS flow marker (e.g. a QFI), or a QoS end-marker control PDU).

A WTRU may initiate a new random access (RA) procedure with a differentiated set of parameters (e.g. transmit power, power ramping step, or back off duration), which may depend on or be based on the new QoS state. The WTRU may be configured with a subset of PRACH resources per QoS state or access category. The WTRU may initiate a new RA procedure on the PRACH resources associated with the newly activated QoS state upon transitioning to a different QoS type/state. The WTRU may be configured with a subset of SR resources per QoS state or access category. The WTRU may trigger a new SR on the SR configuration associated with the newly activated QoS state upon transitioning to a different QoS type. The WTRU may trigger a new SR, for example, if it does not have UL-SCH resources associated with the QoS state. The WTRU may multiplex the QoS transition indication on an available UL-SCH resource that is associated with the QoS state or a logical channel (LCH) mapped to the QoS flow.

The WTRU may perform follow-up actions. The follow-up actions may be associated with the triggering conditions and QoS configuration information. For example, the WTRU may alter measurements or PDCCH monitoring periodicity, perform a random access, terminate a connection, enter DRX, send a report to the network, or other action as described herein.

The WTRU may revert to a default QoS state or configuration upon satisfaction of one or more conditions. The conditions may comprise at least one of: expiration of a time associated with the configuration, an explicit indication from the network (e.g. RRC reject message), or a configuration subject to periodicity.

A single event may trigger multiple WTRUs to change QoS state. To avoid overloading of multiple reports of the same event and minimize signaling necessary to facilitate a QoS state transition, WTRUs with similar QoS state transition characteristics may be grouped together. A QoS state transition may be performed in a coordinated or joint manner. A WTRU may coordinate with other WTRUs within a group prior to a QoS state transition. Upon reception of a plurality of trigger conditions, a master node may report to the network and indicate to other nodes to perform a QoS state transition.

Figure 3:
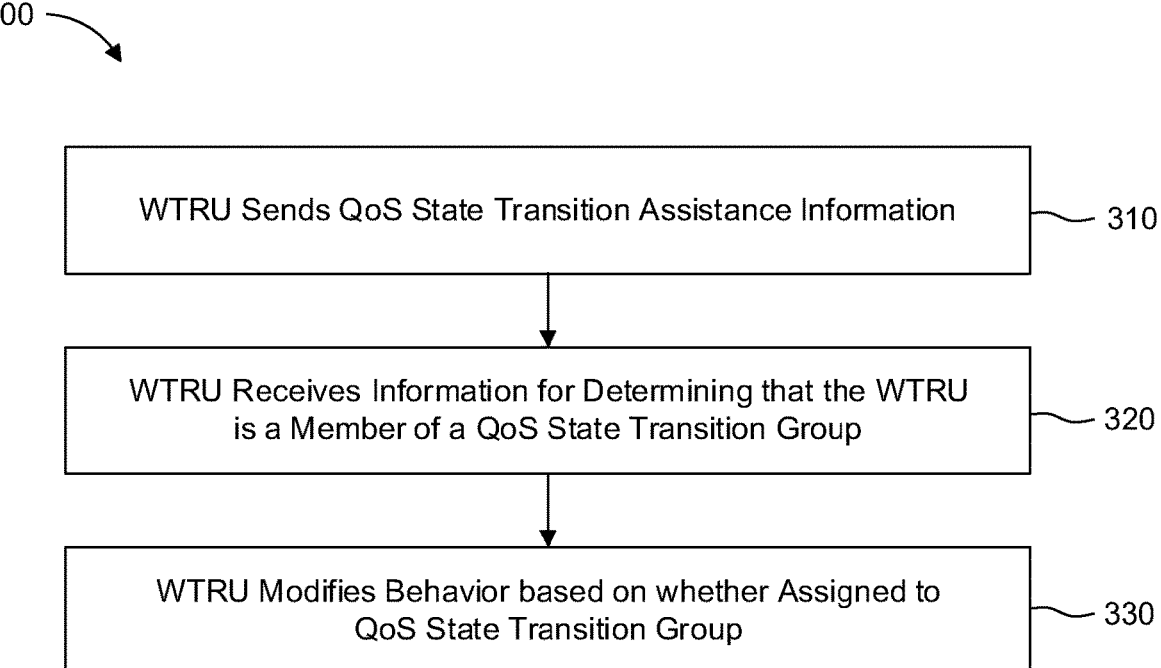
FIG. 3 is an example method of group-based QoS state transition.

A WTRU may be assigned to a group with similar QoS state transition characteristics (e.g. periodicity or monitoring a same event). FIG. 3 is an example method of group-based QoS state transition (300). The WTRU may transmit QoS state transition assistance and/or registration information for determining whether the WTRU shares similar QoS state transition characteristics (310). For example, the WTRU may provide and be grouped based on at least one of: a WTRU device type or class (e.g. whether the WTRU is an mMTC, IoT, smart grid, V2X, RedCap, URLLC, IIoT, sensor, smartphone, or other device type); the WTRU may provide more than one WTRU device type or class corresponding with the different QoS states that the WTRU supports; WTRU capabilities (e.g. whether the WTRU is capable of supporting a QoS state transition); an event or type of event that the WTRU is monitoring; triggering condition or conditions that may cause a QoS state transition; a WTRU position, location, or area that the WTRU is monitoring and may be provided periodically, or only if the information is updated; traffic characteristics (e.g. typical packet size, periodicity and QoS characteristics (e.g. 5QI) associated with each QoS state supported by the WTRU). The QoS state transition assistance information and/or registration information may be sent to a network (e.g. gNB) or another WTRU.

The QoS state transition assistance information and/or registration information may be provided explicitly. For example, the WTRU may provide WTRU registration information during unified access control, as part of a device type indication, or during WTRU capability reporting via MAC CE or RRC signaling. The QoS state transition assistance information and/or registration information may be provided implicitly, for example, via transmission on dedicated resources, use of reserved preambles, reserved cells, or RNTIs.

A WTRU may receive information for determining that the WTRU is a member of a QoS state transition group (320). For example, the WTRU may determine that it is a member of a QoS state transition group based upon, for example any of the following: reception of a group RNTI; assignment to dedicated resources (e.g. time and/or frequency resources); reception of information related to a primary node (e.g. the primary node may act as a group representative regarding QoS state transition); reception of information regarding the QoS state transition group (e.g. the WTRU may receive information to identify or address other WTRUs within the group, the number of WTRUs within the group, or other information related to sidelink communication between a group of WTRUs); reception of one or more configurations associated with multiple QoS states; a preamble; a network slice; a device type, UAC access class; or BWP.

A WTRU may modify its behavior based on whether it is assigned to a QoS state transition group (330). The WTRU may apply different configurations, parameters, access characteristics, or RNTIs depending on whether the WTRU is operating as part of a group or individually. Once assigned to a QoS state transition group, the WTRU may request resources, use RNTIs, or apply configurations associated with that QoS state transition group. The WTRU may belong to the QoS state transition group when in a different QoS state than a default, regular, or fallback state. For example, a WTRU in a default or fallback QoS state may not use configurations, RNTIs, or resources associated with the QoS state transition group unless the WTRU is in a modified or transitioned QoS state. A WTRU may apply a QoS state transition configuration, different RNTI, or monitor/transmit on a dedicated set of resources periodically. Upon expiration of a period of time, the WTRU may revert to a default, regular, or fallback configuration.

A WTRU may belong or be assigned to a QoS state transition group semi-statically, periodically or dynamically. For example, a WTRU may store a configuration indefinitely, or until an expiration of a condition is satisfied. An expiration condition may be a finite set of resources (e.g. number of slots, frames, symbols, transmissions), or a time period associated with the group configuration. The WTRU may assume it is no longer part of a QoS state transition group upon, for example: explicit indication (e.g. to release stored group configuration); rejection from a connection attempt (e.g. reception of an RRC Reject message); if a WTRU changes an RRC connection state (e.g. a WTRU may maintain a configuration while in RRC Connected or RRC Inactive state, and may release the configurations associated with the QoS state transition group upon transition to RRC Idle or Inactive; while in DRX active time or during a DRX onDuration (e.g. once a WTRU enters DRX sleep, the WTRU may assume the group configuration is no longer applicable and may apply a regular or fallback configuration upon a next DRX onDuration); upon WTRU mobility; or RLF.

A WTRU may request to join or be removed from a QoS state transition group. For example, a WTRU may indicate or request to join a group or be removed from a group during a dedicated preamble, Msg3 UL grant or msgA PUSCH resource, dedicated RRC signaling, UCI, MAC CE, SR, or transmission on a dedicated set of time/frequency resources.

A WTRU may belong to more than one QoS state transition group. The WTRU may select between group configurations, for example, by applying a configuration associated with a highest priority QoS state.

A WTRU may trigger a QoS type/state transition upon detection of an event and/or determining at least one of the following: receiving a dynamic indication from the network or other WTRUs; receiving a broadcast signal from the network or another WTRU(s) in the cell indicating a QoS type change or a QoS state transition; failing to receive a periodic signal from a gNB possibly for a number of repeated times or a period of time; performing a cell change; detecting that the serving cell has been turned off or was switched to a low transmission power mode; detecting a group mobility event; satisfying a condition for mobility based conditional handover (CHO); detecting an LBT failure or a consistent UL LBT failure; and/or receiving signaling from another WTRU (e.g. an anchor WTRU in a platoon) on the sidelink.

A WTRU may coordinate with other WTRUs within a group prior to QoS state transition, for example via sidelink, upon satisfaction of one or more QoS state triggering conditions.

Upon triggering a QoS type/state transition and/or detecting a triggering event, a WTRU may perform at least one of the following actions: notify the network or other connected WTRUs about the detection of the event (e.g. by transmitting a UCI on a PUCCH or a PUSCH, triggering an SR, or multiplexing the report on a MAC CE or a PUSCH available grant); transmitting a report either on a Uu or sidelink; transmitting a broadcast signal to other connected WTRUs (e.g. for an anchor WTRU in a platoon); performing a QoS state transition (e.g. transitioning or requesting to transition to IDLE, INACTIVE, or connected mode); activate or deactivate a bandwidth part; switch to another bandwidth part (e.g. a default of initial BWP); activate or deactivate PDCCH monitoring on a particular or additional CORESET or search space; and/or initiate a new random access procedure.

Upon triggering a QoS type/state transition and/or detecting a triggering event, a WTRU may modify its transmission characteristics, including, for example, the WTRU's initial access priority class, transmission parameters, PUSCH and/or PUCCH transmission power or power control parameters.

Upon detection or triggering of a QoS type/state transition, a WTRU may perform additional verification of the event prior to performing the QoS type/state transition. For example, upon detection of a triggering event a WTRU may communicate, for example via sidelink, to other WTRUs within a QoS state transition group that it has detected an event trigger. The WTRU may then perform a QoS state transition if a number (N) of WTRUs respond with an acknowledgement of the event.

A WTRU may modify follow up actions to a triggering event based on additional verification of the triggering event. For example, if the WTRU detects that other WTRUs, possibly within the same QoS state transition group, have also experienced the triggering event, the WTRU may select an alternative configuration between multiple stored configurations, request a different set of resources or amount of resources, enter a different QoS state, or cancel a transmission.

After triggering a QoS type/state transition and/or detecting a triggering event, the WTRU may notify the network or other connected WTRUs about the detection of the event. The notification may be sent, for example, if one or more conditions are met or satisfied. A condition may be that a number of WTRUs within a group is greater than a number (N) or a number of WTRUs that have detected the triggering event is larger than a configured or predetermined threshold. The WTRU may determine the number of affected WTRUs from the number of directly connected WTRUs via sidelink. A condition may be that an amount of resources exceeds a value (X). The WTRU may determine that a number of PRBs required to meet a minimum or guaranteed data rate associated with the old QoS state is larger than a configured or predetermined threshold, larger than the number of PRBs, or the guaranteed rate is larger than the TBS of the available grant/transmission duration of the grant. A condition may be that service requirements for the WTRU are about to fail. The WTRU may report a detected event or QoS state change if the latency associated with the QoS flow, LCH, or DRB is not satisfied or about to be satisfied. The WTRU may report a detected event or QoS state change after a number of configured or predetermined retransmissions or channel conditions. The WTRU may determine that a measured BLER, RSRP, or CQI associated with the channel is less than a required threshold to meet the service or QoS state and report the QoS state change accordingly.

A WTRU may determine to transition from a first QoS state to a second QoS state without network knowledge. A primary WTRU in a group may indicate to other WTRUs in the group that the members of the group should transition QoS states. A non-primary WTRU receiving an indication that a QoS state transition is required may report its QoS state transition to a primary WTRU or to the gNB. A non-primary WTRU receiving an indication from a primary WTRU that a QoS state transition is required may transmit a QoS state transition request to the gNB.

A primary WTRU triggered to transition QoS states may indicate to the non-primary WTRUs of the group that they may also transition QoS states. A primary WTRU triggered to transition QoS states may indicate to the gNB that it has transitioned. A primary WTRU triggered to transition QoS states may indicate to the gNB that it has transmitted an indication to the non-primary WTRUs that a QoS state transition is required.

A primary WTRU triggered to transition QoS states may transmit a request to the gNB prior to indicating to non-primary WTRUs to transition QoS states. The primary WTRU may transmit the indication to non-primary WTRUs if it receives a confirmation from the gNB.

A non-primary WTRU triggered to transition QoS states may transmit a request or report to a primary WTRU.

A QoS state transmission request or indication or report may be assigned a unique identification (ID). A WTRU may request a QoS state transition to either a primary WTRU or gNB and may indicate the unique ID in the request. The WTRU may receive a QoS state transition confirmation including the unique ID. The received QoS state transition confirmation may be from a node other than to whom it made the request. This may ensure that if there are multiple overlapping requests occurring, there is no ambiguity as to which request has been confirmed and by whom.

A WTRUs QoS state transition may be overridden by a primary WTRU or gNB. For example, a WTRU may be triggered to transition QoS states and may indicate such to a primary WTRU. The indication may comprise a unique ID. The WTRU may receive an indication from the gNB, possibly with the same unique ID, informing the WTRU that a QoS state transition may not occur.

A group of WTRUs may be assigned an ID. A WTRU may monitor transmission for its group or for other groups. A WTRU may determine that a QoS state transition is required if another group is transitioning states, possibly dependent on the ID of the group that is transitioning states.

If a large number of WTRUs transition to a more resource-intensive QoS state, a WTRU may have resources re-purposed and the resources or channel or a subset of resources or channels may be re-allocated to higher priority critical WTRUs (e.g. mMTC devices).

A WTRU may receive an indication indicating that a current UL or DL resource and/or a future scheduled UL or DL resource is no longer permitted, available, or valid. This indication may be referred to as a channel clear indication or clear channel indication. The clear channel indication may apply to an entire set of resources or channel or to a subset of resources or channel. The clear channel indication may apply to a specific set of frequencies, a frequency range, a specific time duration, or a combination thereof. The clear channel indication may apply for a specific duration. The clear channel indication may apply for a particular periodicity. The clear channel indication may apply for a specific UE class (e.g. device type). The clear channel indication may act as a trigger to a preconfigured behavior. The clear channel indication may apply only to a specific type of transmission (e.g. PUSCH, all UP data, CP data, measurement resources, or priority level).

A clear channel indication may indicate one or more of the following: one or more UL or DL transmissions is cancelled; traffic on a specific channel or set of resources is cancelled, not monitored, or not permitted to be transmitted (e.g. PDCCH, PDSCH, PUCCH, PUSCH, BCCH); only traffic on a specific channel or channels are monitored or allowed to be transmitted; a measurement object is no longer valid; the WTRU may not transmit for a time duration and/or a frequency range; the WTRU may not monitor for downlink transmissions for a time duration and/or a frequency range; all user-plane transmissions or receptions are cancelled or not monitored; only user plane transmissions are allowed or to be monitored; all control-plane transmissions or receptions are cancelled or not monitored; only control plane transmissions are allowed to be monitored; initial transmissions are not permitted; only initial transmissions are permitted; retransmissions are not permitted; only retransmissions are to be permitted; initiation of RACH is not permitted; transmissions on configured grants are suspended; only transmissions on configured grants are allowed; transmissions on dynamic grants are suspended; only transmissions on dynamic grants are allowed; only transmissions above a specific priority class are allowed; transmissions below a specific priority class are suspended; HARQ feedback is suspended; the WTRU is temporarily barred from accessing a cell or cells; or the WTRU is only able to access a cell or cells.

The WTRU may monitor for a clear channel indication with a dedicated RNTI, for example a clear channel RNTI (CC-RNTI). The clear channel indication may be broadcast, for example in system information, via a PDCCH (e.g. DCI). The clear channel indication may be provided by a semi-static configuration, for example via RRC signaling.

In response to reception or activation of a clear channel indication, the WTRU may perform one or more actions. The actions may be performed throughout a duration of the clear channel indication. The actions may be performed upon resources indicated. The actions may be performed on the UL/DL transmissions and/or channels affected by the clear channel indication. The WTRU may cancel an UL transmission (e.g. discard or buffer the affected TB or TBs). The WTRU may discard a DL reception (e.g. discard packets which are fully or partially within a duration or resource set indicated by the clear channel indication). The WTRU may enter DRX. The WTRU may perform a mobility action. The WTRU may perform a BWP switch. The WTRU may modify an RRC state (e.g. enter RRC IDLE or INACTIVE state). The WTRU may alter measurement resources or a configuration. The WTRU may revert to a default configuration or set of parameters. The WTRU may discard or neglect L1/L3 measurement results on indicated resources.

Throughout a duration of a clear channel indication, one or a subset of WTRUs may still access the channel affected by the clear channel indication. The WTRU or subset of WTRUs may access the channel via a different configuration. For example, a WTRU may revert to a default set of transmission parameters. The default set of parameters may comprise at least one of: periodicity, transmission length, or power ramping. The default set of parameters may represent a minimum channel access to fulfill QoS requirements. Whether a WTRU may still access a channel may be based on, for example: a priority of the transmission or reception; characteristics of a packet (e.g. SCS, TBS); whether the received information is necessary for the WTRU to maintain connection to the network; to receive information regarding life safety (e.g. ETWS or CMAS notification); depending on unified access control class; or device type or characteristics. The WTRU may access the channel if explicitly configured with an ability, under emergency UAC access class that URLLC requirements are about to be violated. The WTRU may still access the channel by attempting a RACH with a dedicated RNTI for use during the clear channel duration.

A WTRU may determine that a QoS state transition is triggered. The WTRU may enter or apply a temporary configuration in response to the trigger. Such a temporary configuration may enable the WTRU to determine a new BWP or carrier or cell(s) to connect to prior to transitioning to a new QoS state. For example, a WTRU may operate in a first QoS state in a first BWP in a first carrier. The WTRU may be triggered to transition QoS states. Such a transition may be associated to moving to a second BWP in a second carrier. The second carrier may be the same as the first carrier. The WTRU may have multiple second BWPs or second carriers to select from. The temporary configuration may enable the WTRU to perform required measurements to select an appropriate second BWP or second carrier.

The WTRU may report its measurements to a network (e.g. gNB) in the temporary configuration. This may enable the WTRU to receive instruction from the gNB as to what BWP or carrier or cell to move to. The WTRU may perform handover (HO) to a new cell autonomously and indicate the HO to the new cell, using either a temporary configuration or configurations associated to a second QoS state.

A WTRU may have a PDCCH monitoring configuration applicable to the temporary configuration. Such monitoring configuration may be limited and/or reserved to enable the WTRU to receive an indication of a BWP or carrier or cell switch/handover.

The temporary configuration may itself be considered a QoS state. In such a case, a WTRU operating in a first QoS state may be triggered to switch to a second QoS state and may first operate using a third (e.g. temporary) state to perform and report required measurements. The WTRU may then be informed of the appropriate second QoS state to transition to.

When performing measurements on neighbor cells (e.g. CONNECTED or IDLE or INACTIVE mode measurements), a WTRU may detect if a cell is operating under a specific QoS state. For example, cells may broadcast the QoS states that certain WTRUs may operate in. The WTRU may use that information when determining measurements associated to a cell. For example, a WTRU may offset cell measurements based on the associated QoS state of the cell.

A WTRU may initiate a handover (HO) procedure (e.g. measurements, RA, HO request) when triggered to transition QoS states. The WTRU may be configured with a conditional HO with a trigger being a QoS state transition. The WTRU may select a target cell as a function of the QoS state.

Figure 4:
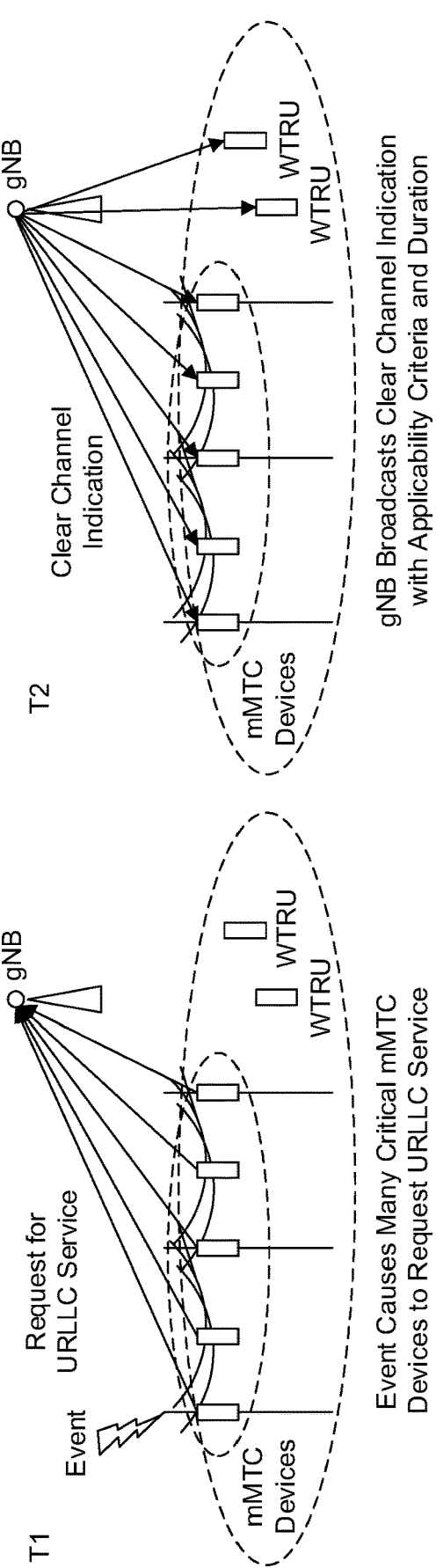
FIG. 4 is an example of an indication that a current UL or DL resource and/or a future scheduled UL or DL resource is no longer available triggered by multiple devices requiring differentiated QoS service.

FIG. 4 shows an example of an indication (e.g. clear channel indication) that a resource or resource set is no longer permitted, available, or valid is triggered by multiple devices requiring differentiated QoS service. The resource or resource set may be past scheduled resources, current resources, or future scheduled resources. In an embodiment, multiple critical mMTC devices may be served in a cell with other WTRUs and/or devices with other QoS requirements. At a first time (e.g. time TO), one or more devices within the cell may receive an RNTI (e.g. a clear channel RNTI (CC-RNTI) to monitor for an indication (e.g. clear channel indication) that a current UL or DL resource and/or a future scheduled UL or DL resource is no longer permitted, available, or valid. The one or more devices may also receive a fallback configuration (e.g. measurement configuration, CG configuration, RACH configuration, PDCCH monitoring periodicity) to apply based on the clear channel indication.

At a second time (e.g. T1 in FIG. 4), an event may occur which may trigger one or more devices (e.g., critical mMTC device) to request a differentiated QoS service (e.g., URLLC service). The one or more devices may send a request for differentiated service (e.g. URLLC service) to a network (e.g. gNB). Upon reception of one or more requests for differentiated service, at a third time (e.g. T2 in FIG. 4) the gNB may broadcast an indication (e.g. clear channel indication) that a current UL or DL resource and/or a future scheduled UL or DL resource is no longer permitted, available, or valid. The clear channel indication may include an applicability criteria (e.g., a QoS service level or WTRU location) and resources (e.g., duration and/or frequency) within which the clear channel indication applies.

Upon reception of a clear channel indication, a WTRU may compare the applicability criteria with a current WTRU configuration and/or services. If the WTRU determines that the clear channel indication is applicable (e.g., the QoS requirements of the WTRU are less than a threshold to maintain normal operation; the WTRU location is located on a cell edge; packet characteristics for an upcoming transmission or reception are unsuitable or do not contain information relevant to life safety or connection maintenance; the WTRU used a lower-priority access category during unified access control (UAC); or a device type is lower priority) the WTRU may apply a fallback configuration for at least the resources indicated by the clear channel indication.

The WTRU may be configured with additional actions, which may be performed conditional on whether the WTRU was previously scheduled to access the channel (e.g., transmit or receive data) and/or assess the channel (e.g., perform measurements) on the resources indicated by the clear channel indication. For example, if the WTRU has an UL grant or CG configuration overlapping with resources indicated by the clear channel indication, the WTRU may suspend or discard UL transmission. In an example, if the WTRU has a DL assignment or semi-persistent scheduling overlapping with resources indicated by the clear channel indication, the WTRU may discard the DL reception. In an example, if the WTRU has measurement resources (e.g., CSI-RS) overlapping with resources indicated by the clear channel indication, the WTRU may discard measurements.

Figure 5:
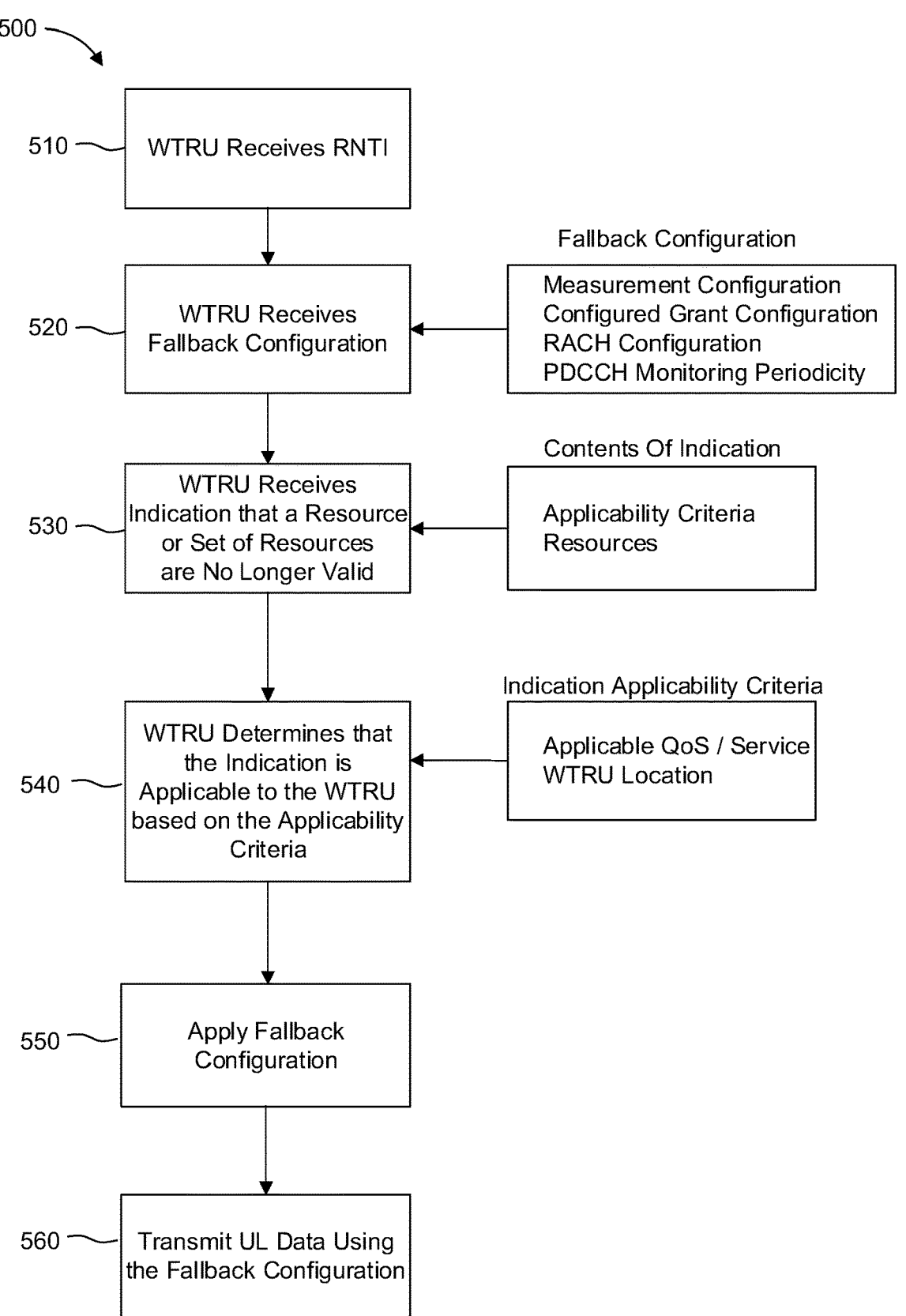
FIG. 5 is an example method for re-purposing scheduled resources.

FIG. 5 shows an example method for re-purposing scheduled resources. A WTRU may receive an RNTI (510). The RNTI may be an RNTI for the purpose of receiving an indication that a resource or set of resources are no longer valid, permitted, or available. The RNTI may be referred to as a clear channel RNTI (CC-RNTI). The WTRU may receive a fallback configuration (520). The fallback configuration may comprise, for example, one or more of: a measurement configuration, a configured grant configuration, a RACH configuration, and a PDCCH monitoring periodicity. The WTRU may receive an indication that a resource or set of resources (e.g. time and/or frequency resources) are no longer valid, permitted, or available (530). The resource or set of resources may be past scheduled resources, current resources, or future scheduled resources. The indication may be referred to as a clear channel indication or channel clear indication (CCI). The contents of the indication may comprise, for example, applicability criteria and resources (e.g. time and/or frequency resources). The WTRU may use the RNTI to determine whether the indication is for the WTRU or to decode a received message that comprises the indication. The WTRU may determine whether the indication applies to the WTRU based on the applicability criteria (540). For example, the WTRU may determine whether a current configuration or characteristic of the WTRU matches an applicability criteria. The applicability criteria may comprise, for example one or more of: an applicable QoS or service; WTRU location; packet characteristics for an upcoming transmission or reception during a clear channel indication resource or set of resources (e.g.

subcarrier spacing, transport block size, modulation and coding scheme, and MIMO coding matrix); whether the information to be transmitted or received during the clear channel indication is necessary for the WTRU to maintain a connection to the network (e.g. signaling related to an RRCSetup/RRCResume procedure, connection re-establishment, RLM, or RLF related signaling); whether the WTRU will receive/transmit/update information related to life safety (e.g. signaling related to ETWS or CMAS); a unified access control (UAC) class of a WTRU connection; a device type (e.g. whether the device is a redcap, eMBB or URLLC type device) or other device characteristics (e.g. WTRU speed, WTRU power class, or mobility state estimation status). If the WTRU determines that the indication applies to the WTRU, the WTRU may apply the fallback configuration (550). The WTRU may transmit uplink data using the fallback configuration (560).

Figure 6:
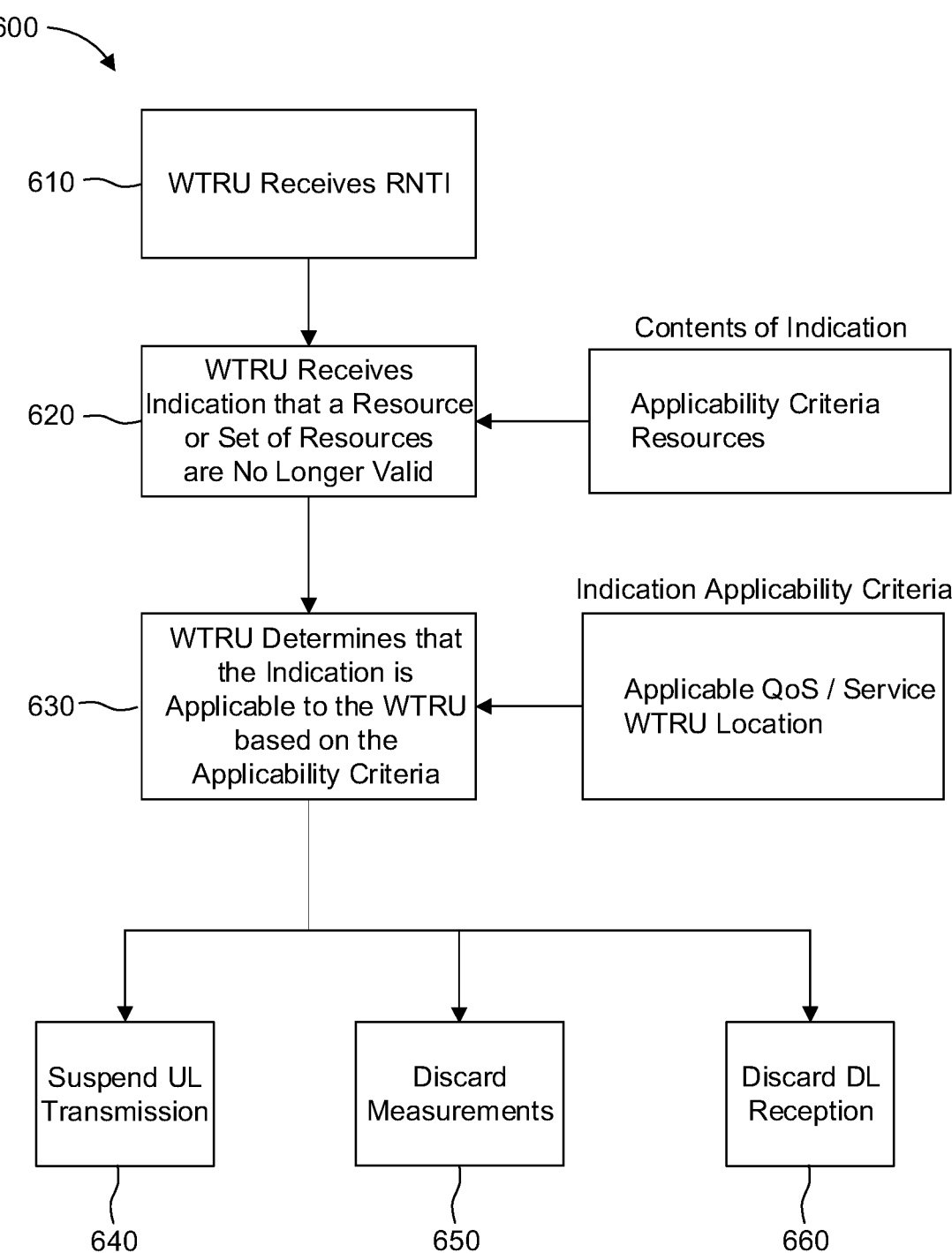
FIG. 6. is an example method for re-purposing scheduled resources.

FIG. 6 shows an example method for re-purposing scheduled resources. A WTRU may receive an RNTI (610). The RNTI may be an RNTI for the purpose of receiving an indication that a resource or set of resources are no longer valid, permitted, or available. The RNTI may be referred to as a clear channel RNTI (CC-RNTI). The WTRU may receive an indication that a resource or set of resources (e.g. time and/or frequency resources) are no longer valid, permitted, or available (620). The resource or set of resources may be past scheduled resources, current resources, or future scheduled resources. The indication may be referred to as a clear channel indication or channel clear indication. The contents of the indication may comprise, for example, applicability criteria and resources (e.g. time and/or frequency resources). The WTRU may use the RNTI to determine whether the indication is for the WTRU or to decode a received message that comprises the indication. The WTRU may determine whether the indication applies to the WTRU based on the applicability criteria (630). For example, the WTRU may determine whether a current configuration or characteristic of the WTRU matches an applicability criteria The applicability criteria may comprise, for example, an applicable QoS or service or WTRU location. If the WTRU determines that the indication applies to the WTRU, the WTRU may perform one or more actions. The WTRU may suspend an uplink transmission (640). The WTRU may suspend an uplink transmission if, for example, the WTRU has an uplink grant or configured grant configuration that overlaps with resources applicable to the received clear channel indication. The WTRU may discard measurements (650). The WTRU may discard measurements if, for example, the WTRU has measurement resources that overlap with resources applicable to the clear channel indication. The WTRU may discard a downlink reception (660). The WTRU may discard a downlink reception if, for example, the WTRU has a downlink reception that overlaps with resources applicable to the clear channel indication. The WTRU may take other actions on a condition that a current configuration or characteristic of the WTRU matches an applicability criteria. For example, the WTRU may enter a discontinuous reception (DRX) state, perform a mobility action; perform a bandwidth part (BWP) switch; or modify a radio resource control (RRC) state.

FIG. 7 shows an example method for re-purposing scheduled resources. A WTRU may receive an RNTI (710). The RNTI may be an RNTI for the purpose of receiving an indication that a resource or set of resources are no longer valid, permitted, or available. The RNTI may be referred to as a clear channel RNTI (CC-RNTI). The WTRU may receive a fallback configuration (720). The fallback configuration may comprise, for example, one or more of: a measurement configuration, a configured grant configuration, a RACH configuration, and a PDCCH monitoring periodicity. The WTRU may receive an indication that a resource or set of resources (e.g. time and/or frequency resources) are no longer valid, permitted, or available (730). The resource or set of resources may be past scheduled resources, current resources, or future scheduled resources. The indication may be referred to as a clear channel indication or channel clear indication (CCI). The contents of the indication may comprise, for example, applicability criteria and resources (e.g. time and/or frequency resources). The WTRU may use the RNTI to determine whether the indication is for the WTRU or to decode a received message that comprises the indication. The WTRU may determine whether the indication applies to the WTRU based on the applicability criteria (740). For example, the WTRU may determine whether a current configuration or characteristic of the WTRU matches an applicability criteria. The applicability criteria may comprise, for example, an applicable QoS or service or WTRU location. If the WTRU determines that the indication applies to the WTRU, the WTRU may perform one or more actions. The WTRU may apply the fallback configuration (750). The WTRU may transmit uplink data using the fallback configuration (760). The WTRU may suspend an uplink transmission (770). The WTRU may suspend an uplink transmission if, for example, the WTRU has an uplink grant or configured grant configuration that overlaps with resources applicable to the received clear channel indication. The WTRU may discard a measurement (780). The WTRU may discard a measurement if, for example, the WTRU has measurement resources that overlap with resources applicable to the clear channel indication. The WTRU may discard a downlink reception (790). The WTRU may discard a downlink reception if, for example, the WTRU has a downlink reception that overlaps with resources applicable to the clear channel indication. The WTRU may take other actions on a condition that a current configuration or characteristic of the WTRU matches an applicability criteria. For example, the WTRU may enter a discontinuous reception (DRX) state, perform a mobility action; perform a bandwidth part (BWP) switch; or modify a radio resource control (RRC) state Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU), the method comprising:

receiving a clear channel radio network temporary identifier (RNTI);

receiving fallback configuration information;

receiving a clear channel indication in a downlink control information (DCI) over a physical downlink control channel (PDCCH) based on the clear channel RNTI, wherein the clear channel indication indicates that a particular resource or set of resources are no longer available, wherein the clear channel indication comprises applicability criteria and applicability resource information;

applying a fallback configuration based on the fallback configuration information in resources based on the applicability resource information on a condition that a characteristic of the WTRU matches at least one applicability criteria; and transmitting or receiving data based on the fallback configuration.

2. The method of claim 1, wherein the fallback configuration comprises at least one of: a measurement configuration, a configured grant configuration, a random access channel (RACH) configuration, or a physical downlink control channel (PDCCH) monitoring periodicity configuration.

3. The method of claim 1, wherein the clear channel RNTI is used for receiving the clear channel indication.

4. The method of claim 1, wherein the clear channel indication is received from a gNB.

5. The method of claim 1, wherein the applicability criteria comprises at least one of: an applicable quality of service (QoS); a WTRU type; a WTRU location; a QoS state transition group; a packet characteristic for an upcoming transmission or reception during the resources indicated by the applicability resource information; whether information to be transmitted or received during the resources indicated by the applicability resource information is necessary for the WTRU to maintain a connection to a network; whether the WTRU will receive or transmit information related to life safety; a unified access control (UAC) class of a WTRU connection; a device type; a WTRU speed; a WTRU power class; or a mobility state estimation status.

6. The method of claim 1, wherein the applicability resource information comprises at least one of: semi-static resources, a time duration, and a frequency duration.

7. The method of claim 1, further comprising:

suspending an uplink transmission on a condition that a characteristic of the WTRU matches at least one applicability criteria and the WTRU has an uplink grant for which resources of the uplink grant overlap with resources of the applicability resource information.

8. The method of claim 1, further comprising:

discarding measurements on a condition that a characteristic of the WTRU matches at least one applicability criteria and the WTRU has measurement resources that overlap with resources of the applicability resource information.

9. The method of claim 1, further comprising:

discarding a downlink reception on a on a condition that a characteristic of the WTRU matches at least one applicability criteria and the WTRU has downlink reception resources that overlap with resources of the applicability resource information.

10. The method of claim 1, further comprising performing an action on a condition that the WTRU matches at least one applicability criteria, wherein the action comprises at least one of: entering a discontinuous reception (DRX) state; performing a mobility action; performing a bandwidth part (BWP) switch; or modifying a radio resource control (RRC) state.

11. A wireless transmit/receive unit (WTRU) comprising:

a processor; and a transceiver, wherein:

the transceiver is configured to receive a clear channel radio network temporary identifier (RNTI);

the transceiver is further configured to receive fallback configuration information;

the transceiver is further configured to receive a clear channel indication in a downlink control information (DCI) over a physical downlink control channel (PDCCH) based on the clear channel RNTI, wherein the clear channel indication indicates that a particular resource or set of resources are no longer available, wherein the clear channel indication comprises applicability criteria and applicability resource information;

the processor is configured to apply a fallback configuration based on the fallback configuration information in resources based on the applicability resource information on a condition that a characteristic of the WTRU matches at least one applicability criteria; and the transceiver is further configured to transmit or receive data based on the fallback configuration.

12. The WTRU of claim 11, wherein the fallback configuration comprises at least one of: a measurement configuration, a configured grant configuration, a random access channel (RACH) configuration, or a physical downlink control channel (PDCCH) monitoring periodicity configuration.

13. The WTRU of claim 11, wherein the clear channel RNTI is used to receive the clear channel indication.

14. The WTRU of claim 11, wherein the clear channel indication is received from a gNB.

15. The WTRU of claim 11, wherein the applicability criteria comprises at least one of: an applicable quality of service (QoS); a WTRU type; a WTRU location; a QoS state transition group; a packet characteristic for an upcoming transmission or reception during the resources indicated by the applicability resource information; whether information to be transmitted or received during the resources indicated by the applicability resource information is necessary for the WTRU to maintain a connection to a network; whether the WTRU will receive or transmit information related to life safety; a unified access control (UAC) class of a WTRU connection; a device type; a WTRU speed; a WTRU power class; or a mobility state estimation status.

16. The WTRU of claim 11, wherein the applicability resource information comprises at least one of: semi-static resources, a time duration, and a frequency duration.

17. The WTRU of claim 11, wherein the processor is further configured to, on a condition that a characteristic of the WTRU matches at least one applicability criteria and the WTRU has an uplink grant for which resources of the uplink grant overlap with resources of the applicability resource information, suspend an uplink transmission.

18. The WTRU of claim 11, wherein the processor is further configured to, on a condition that a characteristic of the WTRU matches at least one applicability criteria and the WTRU has measurement resources that overlap with resources of the applicability resource information, discard measurements.

19. The WTRU of claim 11, wherein the processor is further configured to, on a on a condition that a characteristic of the WTRU matches at least one applicability criteria and the WTRU has downlink reception resources that overlap with resources of the applicability resource information, discard a downlink reception.

20. The WTRU of claim 11, wherein the processor is further configured to perform an action on a condition that the WTRU matches at least one applicability criteria, wherein the action comprises at least one of: enter a discontinuous reception (DRX) state; perform a mobility action; perform a bandwidth part (BWP) switch; or modify a radio resource control (RRC) state.

\* \* \* \* \*